(12) United States Patent
Irukula et al.

(10) Patent No.: US 11,216,798 B2
(45) Date of Patent: Jan. 4, 2022

(54) SYSTEM AND COMPUTER IMPLEMENTED METHOD FOR EXTRACTING INFORMATION IN A DOCUMENT USING MACHINE READABLE CODE

(71) Applicant: Visa International Service Association, San Francisco, CA (US)

(72) Inventors: Deepak Irukula, Bangalore (IN); Jerry Jose Zachariah, Bangalore (IN); Muthyam Reddy Paaredi, Bangalore (IN); Syeda Nazia, Bangalore (IN)

(73) Assignee: Visa International Service Association, San Francisco, CA (US)

( * ) Notice: Subject to any disclaimer, the term of this patent is extended or adjusted under 35 U.S.C. 154(b) by 148 days.

(21) Appl. No.: 16/654,255

(22) Filed: Oct. 16, 2019

(65) Prior Publication Data

US 2021/0117953 A1 Apr. 22, 2021

(51) Int. Cl.
*G06K 7/14* (2006.01)
*G06Q 20/30* (2012.01)
*G06K 7/10* (2006.01)

(52) U.S. Cl.
CPC ......... *G06Q 20/30* (2013.01); *G06K 7/10712* (2013.01); *G06K 7/1413* (2013.01); *G06K 7/1417* (2013.01)

(58) Field of Classification Search
CPC .......................... G06K 7/1413; G06K 7/1417
USPC ........................................................... 705/39
See application file for complete search history.

(56) References Cited

U.S. PATENT DOCUMENTS 10,445,571 B1 * 10/2019 Gaeta ..................... G06F 16/93

* cited by examiner

*Primary Examiner* — Toan C Ly
(74) *Attorney, Agent, or Firm* — The Webb Law Firm

(57) ABSTRACT

The present disclosure relates to a system and computer-implemented method for extracting information in a document using machine-readable code. The machine-readable code is scanned from a document for determining coordinates of one or more metadata among a plurality of metadata in the document. Information corresponding to the coordinates of the one or more metadata is extracted from the document. The type of the information extracted from the one or more metadata is identified. Finally, the identified information is sent to the one or more devices for performing one or more actions using the identified information.

20 Claims, 8 Drawing Sheets

INVOICE

INVOICE ID - 73825

MERCHANT DETAILS : ID = 1234, BANK – 1, IFSC CODE

ISSUE DATE – 07/09/2019

| ITEM TYPE | QUANTITY | UNIT PRICE | AMOUNT |
|---|---|---|---|
| ITEM - 1 | 3 | 15 | 45 |
| ITEM - 2 | 1 | 60 | 60 |

TOTAL AMOUNT $105

SIGNATURE -

FIGURE 5

SYSTEM AND COMPUTER IMPLEMENTED METHOD FOR EXTRACTING INFORMATION IN A DOCUMENT USING MACHINE READABLE CODE

BACKGROUND

1. Technical Field

The present disclosure relates to information retrieval techniques and application. Particularly, but not exclusively, the present disclosure relates to a system and method for extracting information from a document using machine-readable code.

2. Technical Considerations

Generally, data extraction refers to retrieving information from unstructured or structured data sources. The unstructured data sources include web pages, emails, documents, scanned text, and the like. Further, the retrieved information is used for data processing or data storage. For example, one may perform calculations on the retrieved information, for example, aggregating sales data and store results in a data warehouse.

The existing techniques may extract all information from the data sources which may not be needed for data processing or data storage. An issue with the existing techniques is the lack of ability to extract the required information efficiently. Further, information extracted using such technique needs to undergo various preprocessing techniques before subjecting for information analysis, thus, resulting in process overhead and increased time consumption.

The information disclosed in this background of the disclosure section is only for enhancement of understanding of the general background of the disclosure and should not be taken as an acknowledgement or any form of suggestion that this information forms the prior art already known to a person skilled in the art.

SUMMARY

In some non-limiting embodiments or aspects, provided is a computer-implemented method comprising: scanning, by an image processing system, a machine-readable code from a document for determining coordinates of one or more metadata among a plurality of metadata in the document; extracting, by the image processing system, information corresponding to the coordinates of the one or more metadata from the document; identifying, by the image processing system, type of the information extracted from the one or more metadata; and sending, by the image processing system, the identified information to one or more devices for performing one or more actions using the identified information.

In some non-limiting embodiments or aspects, the machine-readable code comprises at least one of a one-dimensional bar code and a two-dimensional bar code. In some non-limiting embodiments or aspects, scanning the machine-readable code comprises: capturing an image of the machine-readable code from the document; and decoding the machine-readable code from the captured image to obtain the coordinates of the one or more metadata among the plurality of metadata in the document. In some non-limiting embodiments or aspects, the coordinates of the one or more metadata comprises at least one of the following: coordinates of a region of pixels of the one or more metadata in an image of the document, a physical distance of a region of pixels of the one or more metadata in the image of the document from a reference coordinate, or any combination thereof. In some non-limiting embodiments or aspects, extracting the information comprises identifying a group of pixels within a boundary corresponding to the coordinates of the one or more metadata based on image processing techniques. In some non-limiting embodiments or aspects, identifying the type of information comprises: classifying the extracted information as at least one of the following: a picture, holographic label, numbers, alphabets, symbols, or any combination thereof; and recognizing the extracted and classified information using image processing techniques. In some non-limiting embodiments or aspects, the one or more devices comprises at least one of a database server and a payment terminal. In some non-limiting embodiments or aspects, performing the one or more actions comprises at least one of the following: initiating a payment transaction, performing data analytics, or any combination thereof.

In some non-limiting embodiments or aspects, provided is an image processing system for extracting information in a document using machine-readable code, comprising: a processor; and a memory communicatively coupled to the processor, wherein the memory stores processor instructions, which, on execution, causes the processor to: scan the machine-readable code from the document for determining coordinates of one or more metadata among a plurality of metadata in the document; extract information corresponding to the coordinates of the one or more metadata from the document; identify type of the information extracted from the one or more metadata; and send the identified information to one or more devices for performing one or more actions using the identified information.

In some non-limiting embodiments or aspects, the scanning comprises: capturing an image of the machine-readable code from the document; and decoding the machine-readable code from the captured image to obtain coordinates of the one or more metadata among the plurality of metadata in the document. In some non-limiting embodiments or aspects, the coordinates of the one or more metadata comprise at least one of the following: coordinates of a region of pixels of the one or more metadata in an image of the document, a physical distance of a region of pixels of the one or more metadata in the image of the document from a reference coordinate, or any combination thereof. In some non-limiting embodiments or aspects, the extraction comprises identifying a group of pixels within a boundary corresponding to the coordinates of the one or more metadata based on image processing techniques. In some non-limiting embodiments or aspects, the identification comprises: classifying the extracted information as at least one of the following: a picture, holographic label, numbers, alphabets, symbols, or any combination thereof; and recognizing the extracted and classified information using image processing techniques. In some non-limiting embodiments or aspects, the one or more devices comprises at least one of a database server and a payment terminal. In some non-limiting embodiments or aspects, the one or more actions comprises at least one of the following: initiating a payment transaction, performing data analytics, or any combination thereof.

In some non-limiting embodiments or aspects, provided is a computer-implemented method comprising: receiving, by a billing system, a plurality of details associated with a transaction; determining, by the billing system, coordinates for the plurality of details based on a predetermined size of a document; generating, by the billing system, a machine-readable code based on the coordinates of one or more details among the plurality of details and the one or more details; and generating, by the billing system, the document comprising the plurality of details and the machine-readable code.

In some non-limiting embodiments or aspects, the plurality of details comprises at least one of the following: a picture, holographic label, numbers, alphabets, symbols, or any combination thereof. In some non-limiting embodiments or aspects, the coordinates comprise at least one of the following: coordinates of a region of pixels for the plurality of details, a physical distance of a region of pixels for the plurality of details from a reference coordinate, or any combination thereof. In some non-limiting embodiments or aspects, generating the document comprises arranging the plurality of details and the machine-readable code on the predetermined size of the document based on the determined coordinates for the plurality of details. In some non-limiting embodiments or aspects, the document comprising the plurality of details and a machine-readable code is transmitted to a printer for printing the document.

Further non-limiting embodiments or aspects are set forth in the following numbered clauses.

Clause 1: A computer-implemented method comprising: scanning, by an image processing system, a machine-readable code from a document for determining coordinates of one or more metadata among a plurality of metadata in the document; extracting, by the image processing system, information corresponding to the coordinates of the one or more metadata from the document; identifying, by the image processing system, type of the information extracted from the one or more metadata; and sending, by the image processing system, the identified information to one or more devices for performing one or more actions using the identified information.

Clause 2: The method of clause 1, wherein the machine-readable code comprises at least one of a one-dimensional bar code and a two-dimensional bar code.

Clause 3: The method of clause 1 or 2, wherein scanning the machine-readable code comprises: capturing an image of the machine-readable code from the document; and decoding the machine-readable code from the captured image to obtain the coordinates of the one or more metadata among the plurality of metadata in the document.

Clause 4: The method of any of clauses 1-3, wherein the coordinates of the one or more metadata comprises at least one of the following: coordinates of a region of pixels of the one or more metadata in an image of the document, a physical distance of a region of pixels of the one or more metadata in the image of the document from a reference coordinate, or any combination thereof.

Clause 5: The method of any of clauses 1-4, wherein extracting the information comprises identifying a group of pixels within a boundary corresponding to the coordinates of the one or more metadata based on image processing techniques.

Clause 6: The method of any of clauses 1-5, wherein identifying the type of information comprises: classifying the extracted information as at least one of the following: a picture, holographic label, numbers, alphabets, symbols, or any combination thereof; and recognizing the extracted and classified information using image processing techniques.

Clause 7: The method of any of clauses 1-6, wherein the one or more devices comprises at least one of a database server and a payment terminal.

Clause 8: The method of any of clauses 1-7, wherein performing the one or more actions comprises at least one of the following: initiating a payment transaction, performing data analytics, or any combination thereof.

Clause 9: An image processing system for extracting information in a document using machine-readable code, comprising: a processor; and a memory communicatively coupled to the processor, wherein the memory stores processor instructions, which, on execution, causes the processor to: scan the machine-readable code from the document for determining coordinates of one or more metadata among a plurality of metadata in the document; extract information corresponding to the coordinates of the one or more metadata from the document; identify type of the information extracted from the one or more metadata; and send the identified information to one or more devices for performing one or more actions using the identified information.

Clause 10: The image processing system of clause 9, wherein the scanning comprises: capturing an image of the machine-readable code from the document; and decoding the machine-readable code from the captured image to obtain coordinates of the one or more metadata among the plurality of metadata in the document.

Clause 11: The image processing system of clause 9 or 10, wherein the coordinates of the one or more metadata comprises at least one of the following: coordinates of a region of pixels of the one or more metadata in an image of the document, a physical distance of a region of pixels of the one or more metadata in the image of the document from a reference coordinate, or any combination thereof.

Clause 12: The image processing system of any of clauses 9-11, wherein the extraction comprises identifying a group of pixels within a boundary corresponding to the coordinates of the one or more metadata based on image processing techniques.

Clause 13: The image processing system of any of clauses 9-12, wherein the identification comprises: classifying the extracted information as at least one of the following: a picture, holographic label, numbers, alphabets, symbols, or any combination thereof; and recognizing the extracted and classified information using image processing techniques.

Clause 14: The image processing system of any of clauses 9-13, wherein the one or more devices comprises at least one of a database server and a payment terminal.

Clause 15: The image processing system of any of clauses 9-14, wherein the one or more actions comprises at least one of the following: initiating a payment transaction, performing data analytics, or any combination thereof.

Clause 16: A computer-implemented method comprising: receiving, by a billing system, a plurality of details associated with a transaction; determining, by the billing system, coordinates for the plurality of details based on a predetermined size of a document; generating, by the billing system, a machine-readable code based on the coordinates of one or more details among the plurality of details and the one or more details; and generating, by the billing system, the document comprising the plurality of details and the machine-readable code.

Clause 17: The method of clause 16, wherein the plurality of details comprises at least one of the following: a picture, holographic label, numbers, alphabets, symbols, or any combination thereof.

Clause 18: The method of clause 16 or 17, wherein the coordinates comprise at least one of the following: coordinates of a region of pixels for the plurality of details, a physical distance of a region of pixels for the plurality of details from a reference coordinate, or any combination thereof.

Clause 19: The method of any of clauses 16-18, wherein generating the document comprises arranging the plurality of details and the machine-readable code on the predetermined size of the document based on the determined coordinates for the plurality of details.

Clause 20: The method of any of clauses 16-19, wherein the document comprising the plurality of details and a machine-readable code is transmitted to a printer for printing the document.

The foregoing summary is illustrative only and is not intended to be in any way limiting. In addition to the illustrative aspects, embodiments, and features described above, further aspects, embodiments, and features may become apparent by reference to the drawings and the following detailed description. Additional features and advantages are realized through the techniques of the present disclosure. Other embodiments and aspects of the disclosure are described in detail herein and are considered a part of the claimed disclosure.

BRIEF DESCRIPTION OF THE DRAWINGS

The novel features and characteristic of the disclosure are set forth in the appended claims. The disclosure itself, however, as well as a preferred mode of use, further objectives and advantages thereof, may best be understood by reference to the following detailed description of an illustrative embodiment when read in conjunction with the accompanying drawings. The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. One or more embodiments are now described, by way of example only, with reference to the accompanying figures wherein like reference numerals represent like elements and in which:

FIG. 5 shows an exemplary document including a machine-readable code, in accordance with some non-limiting embodiments or aspects of the present disclosure;

Figure 1:
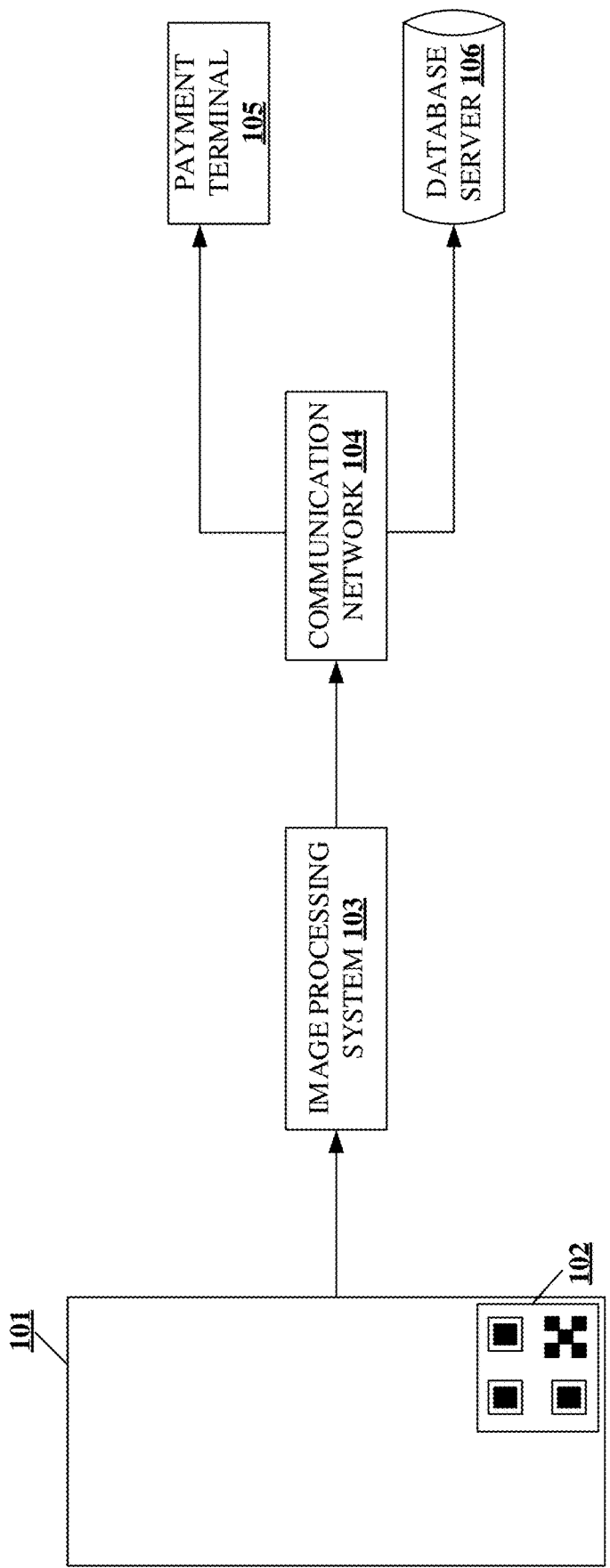
FIG. 1 shows an exemplary environment for extracting information in a document using machine-readable code, in accordance with some non-limiting embodiments or aspects of the present disclosure.

It should be appreciated by those skilled in the art that any block diagrams herein represent conceptual views of illustrative systems embodying the principles of the present subject matter. Similarly, it may be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, a specific embodiment thereof has been shown by way of example in the drawings and may be described in detail below. It should be understood, however, that it is not intended to limit the disclosure to the particular forms disclosed, but on the contrary, the disclosure is to cover all modifications, equivalents, and alternatives falling within the scope of the disclosure.

The terms "comprises", "includes", "comprising", "including", or any other variations thereof, are intended to cover a non-exclusive inclusion, such that a setup, device, or method that comprises a list of components or steps does not include only those components or steps but may include other components or steps not expressly listed or inherent to such setup or device or method. In other words, one or more elements in a system or apparatus proceeded by "comprises . . . a" or "includes . . . a" does not, without more constraints, preclude the existence of other elements or additional elements in the system or apparatus.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, and/or the like) and may be used interchangeably with "one or more" or "at least one." Where only one item is intended, the term "one" or similar language is used. Also, as used herein, the terms "has", "have", "having", or the like are intended to be open-ended terms. Further, the phrase "based on" is intended to mean "based at least in partially on" unless explicitly stated otherwise. The term "some non-limiting embodiments or aspects" means "one or more (but not all) embodiments or aspects of the disclosure(s)" unless expressly specified otherwise. A description of some non-limiting embodiments or aspects with several components in communication with each other does not imply that all such components are required. On the contrary, a variety of optional components is described to illustrate the wide variety of possible embodiments of the disclosure.

When a single device or article is described herein, it will be clear that more than one device/article (whether they cooperate) may be used in place of a single device/article. Similarly, where more than one device or article is described herein (whether they cooperate), it will be clear that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the disclosure need not include the device itself.

As used herein, the terms "communication", "communicate", "send", and/or "receive" may refer to the reception, receipt, transmission, transfer, provision, and/or the like of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and communicates the processed information to the second unit. In some non-limiting embodiments or aspects, a message may refer to a network packet (e.g., a data packet and/or the like) that includes data. It will be appreciated that numerous other arrangements are possible.

As used herein, the terms "server" and/or "processor" may refer to one or more computing devices, such as processors, storage devices, and/or similar computer components that communicate with client devices and/or other computing devices over a network, such as the Internet or private networks, and, in some examples, facilitate communication among other servers and/or client devices. It will be appreciated that various other arrangements are possible. As used herein, the term "system" may refer to one or more computing devices or combinations of computing devices such as, but not limited to, processors, servers, client devices, software applications, and/or other like components. In addition, reference to "a server" or "a processor", as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

The present disclosure relates to system and computer-implemented method for extracting information in a document using machine-readable code. The machine-readable code may be scanned from a document for determining coordinates of one or more metadata among a plurality of metadata in the document. Further, information corresponding to the coordinates of the one or more metadata may be extracted from the document. Furthermore, the type of the information extracted from the one or more metadata may be identified. Finally, the identified information may be sent to one or more devices for performing one or more actions using the identified information.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

FIG. 1 shows an exemplary environment for extracting information in a document using machine-readable code, in accordance with some non-limiting embodiments or aspects of the present disclosure. In some implementations, a document (101) comprising a machine-readable code (102) is provided to an image processing system (103). The machine-readable code (102) comprises at least one of a one-dimensional bar code and a two-dimensional bar code. For example, the one-dimensional bar code includes at least one of UPC code, codebar, EAN code, code 128, and the like. In another example, the two-dimensional bar code includes at least one of a Quick Response (QR) code, data matrix, dotcode, PDF417, and the like. The document (101) may be provided as a physical document or a digitized image of the physical document. Further, the image processing system (103) may obtain the digitized image by capturing an image of the physical document using an image scanning/capturing device.

In some non-limiting embodiments or aspects, a user may provide the digitized image to the image processing system (103) via a wired or a wireless medium. The image processing system (103) scans the machine-readable code (102) from the document (101) for determining coordinates of one or more metadata among a plurality of metadata in the document (101). The metadata is data, e.g., information, which provides information about other data. The image scanning device, for example, a camera, may be used to capture an image of the machine-readable code (102), and the image of the machine-readable code (102) is processed using an error correction technique to determine the coordinates of the one or more metadata stored in the machine-readable code (102).

In some non-limiting embodiments or aspects, the camera may identify the machine-readable code (102) from the digitized image and crop the machine-readable code (102) from the digitized image for scanning the machine-readable code (102). In some non-limiting embodiments or aspects, the one or more metadata includes a name, or an identification tag associated with the information in the document (101), for example, the one or more metadata may include an invoice number, date, address, phone number, "ID1", and the like. The coordinates of the one or more metadata include at least one of coordinates of a region of pixels of the one or more metadata in a digitized image of the document (101), a physical distance of a region of pixels of the one or more metadata in the image of the document (101) from a reference coordinate, and/or a row and column numbers of the one or more metadata in the document (101).

The coordinates of the one or more metadata stored in the machine-readable code (102) may be in at least one of a Cartesian coordinate system format, polar coordinate system format, and the like. The coordinates of the one or more metadata may correspond to the pixel coordinates in the digitized image of the document (101). For example, the coordinates of the one or more metadata may be as given below:

row = 10 and columns = 3, 4, 5 or

{[*x*: 100, *y*: 20] [*x*: 150, *y*: 45] [*x*: 200, *y*: 70] [*x*: 250, *y*: 95]} or

{[2 cm to right from the top left corner of the document (101) and 5 cm to the bottom from the top left corner of the document (101)]}.

In some non-limiting embodiments or aspects, the image processing system (103) extracts the information corresponding to the determined coordinates of the one or more metadata from the document (101) using the one or more image processing techniques. The image processing system (103) identifies the type of the information extracted from the one or more metadata. Further, the image processing system (103) identifies the type of the information by classifying the extracted information as at least one of a picture, a holographic label, numbers, alphabets, symbols, and/or any combination thereof. Further, the image processing system (103) recognizes the extracted and classified information using image processing techniques, for example, optical character recognition, object detection and recognition, and the like.

In some non-limiting embodiments or aspects, the image processing system (103) sends the identified information to the one or more devices for performing one or more actions using the identified information. The one or more devices may include at least one of a payment terminal (105) or a database server (106) (and/or any suitable device) as shown in FIG. 1. The image processing system (103) may be connected to the payment terminal (105) and the database server (106) via a communication network (104). Further, the communication network (106) may include, for example, a direct interconnection, e-commerce network, a peer to peer (P2P) network, local area network (LAN), wide area network (WAN), wireless network (e.g., using Wireless Application Protocol), the Internet, Wi-Fi®, cellular network, etc.

In one implementation, the payment terminal (105) may receive the identified information from the image processing system (103) and initiate a payment based on the received identified information. For example, the identified information may include merchant details and amount required to initiate the payment.

In some non-limiting embodiments or aspects, the database server (106) may receive the identified information from the image processing system (103) and store the identified information for further performing data analytics. For example, the data analytics may include identifying a type of product most often sold in a shop, the number of times a customer has visited the shop in one month, and the like.

Figure 2:
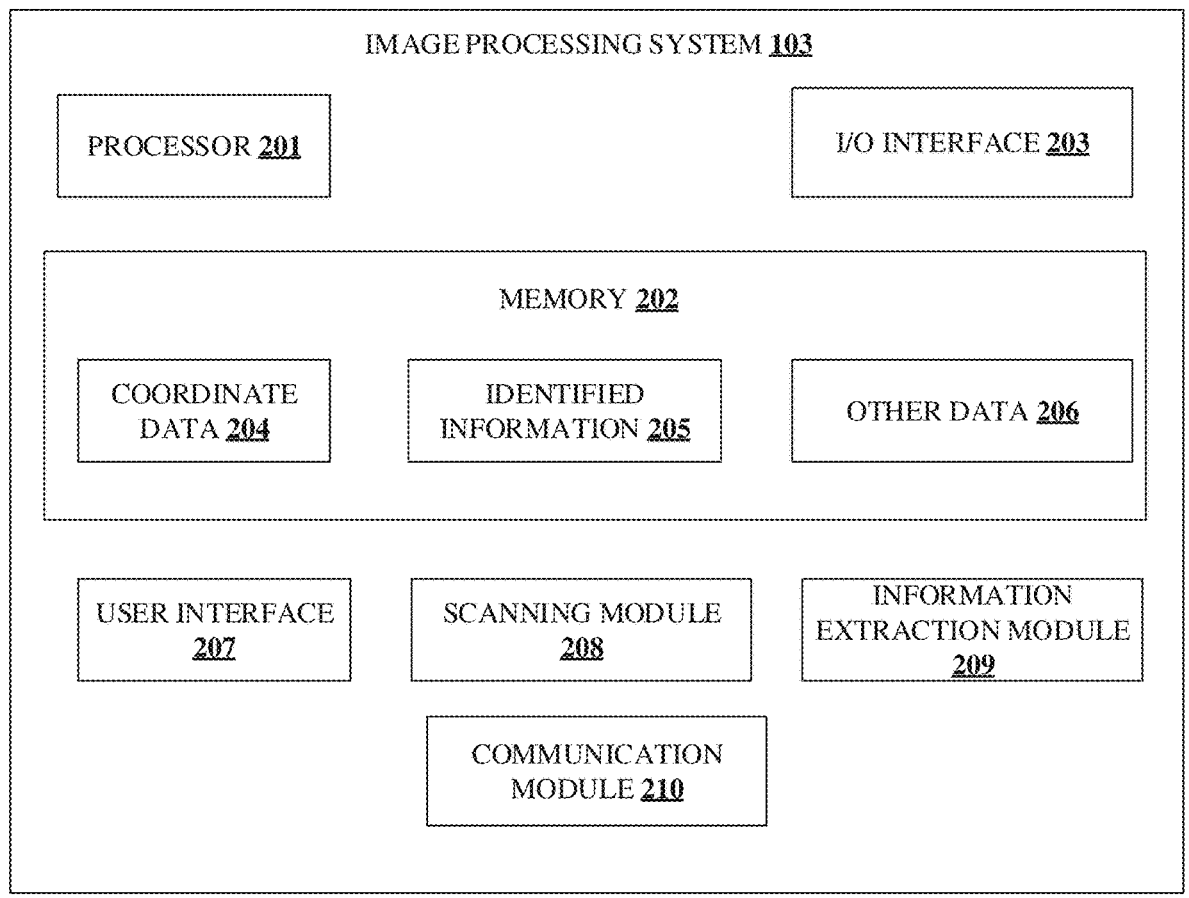
FIG. 2 shows a simplified block diagram of an image processing system for extracting information in a document using machine-readable code, in accordance with some non-limiting embodiments or aspects of the present disclosure.

FIG. 2 shows a simplified block diagram of an image processing system (103), in accordance with non-limiting embodiments or aspects of the present disclosure. In particular, and in some non-limiting embodiments or aspects, the image processing system (103) may include at least one Central Processing Unit ("CPU" or "processor") (201) and a memory (202) storing instructions executable by the at least one processor (201). The processor (201) may comprise at least one data processor for executing program components for executing user or system-generated requests. The memory (202) is communicatively coupled to the processor (201). The image processing system (103) further comprises an Input/Output (I/O) interface (203). The I/O interface (203) is coupled with the processor (201) through which an input signal or/and an output signal is communicated.

In some non-limiting embodiments or aspects, the data stored in the memory (202) may include coordinate data (204), identified information (205), and other data (206). In some non-limiting embodiments or aspects, the coordinate data (204) may include the coordinates of the one or more metadata including at least one of the coordinates of a region of pixels of the one or more metadata in an image of the document (101), a physical distance of a region of pixels of the one or more metadata in the image of the document (101) from a reference coordinate, the row and column number of the one or more metadata in the document (101), or any combination thereof.

In some non-limiting embodiments or aspects, the identified information (205) may include at least one of recognized numbers, alphabets, symbols, pictures, and/or a holographic label extracted from the document (101), based on the determined coordinates of the one or more metadata in the document (101). For example, Invoice Number: AX19-144, Date: Dec. 4, 2001, Total Amount: $120, and the like. In some non-limiting embodiments or aspects, the classified information may be used while performing the one or more actions. For example, while performing an analysis on the transaction amount in the document (101), the total amount value is extracted and used in the analysis. Likewise, for analyzing transactions related to groceries, the text present in the description of the transaction is extracted and provided for analysis. In some non-limiting embodiments or aspects, as the location information of the document (101) like an invoice is known, the image processing system (103) may extract only the required information and discard other information, unlike existing systems where the entire document is scanned. In some non-limiting embodiments or aspects, other data (206) may include data related to error detection and error correction used to decode the machine-readable code (102). The other data (207) may include data related to optical character recognition for recognizing the extracted and classified information.

In some non-limiting embodiments or aspects, the image processing system (103) may include, for example, a user interface (207), a scanning module (208), an information extraction module (209), and/or a communication module (or unit) (210). It will be appreciated that such aforementioned units may be represented as a single unit or a combination of different units. The image processing system (103) may further include other modules or units, which are not depicted, that are used during operation of the image processing system (103).

In some non-limiting embodiments or aspects, the user interface (207) may be housed in the image processing system (103) and communicatively coupled to the processor (201). The user interface (207) may be used to receive the document (101). The user interface (207) may include an image scanning device for capturing the image of the physical document with the machine-readable code (102) to obtain the document (101) in a digitized form. Further, the user interface (207) may be used to display the extracted information from the document (101).

In some non-limiting embodiments or aspects, the scanning module (208) may be housed in the image processing system (103) and communicatively coupled to the processor (201). The scanning module (208) may be used to scan the machine-readable code (102). The scanning module (208)

may capture the image of the machine-readable code (102) from the document (101) and decode the machine-readable code (102) from the captured image to obtain the coordinates of the one or more metadata among the plurality of metadata in the document (101). In some non-limiting embodiments or aspects, the machine-readable code (102) comprises at least one of the one-dimensional bar code and the two-dimensional bar code. For example, the one-dimensional bar code includes at least one of UPC code, codebar, EAN code, code 128, and the like. In another example, the two-dimensional bar code includes at least one of a Quick Response (QR) code, data matrix, dotcode, PDF417, and the like.

In some non-limiting embodiments or aspects, an information extraction module (209) may be housed in the image processing system (103) and communicatively coupled to the processor (201). The information extraction module (209) may use the decoded coordinate information to identify the information to be extracted. For example, the decoded information may provide x-coordinates and y-coordinates. The x-, y-coordinates may be translated into pixels and a group of pixels is identified within the digitized image of the document (101). Further, the information extraction module (209) may be used to classify the extracted information as at least one of a picture, holographic label, numbers, alphabets, symbols, or any combination thereof. The information extraction module (209) may recognize the extracted and classified information using image processing techniques, for example, optical character recognition, object detection and recognition, and the like. In some non-limiting embodiments or aspects, the communication module (210) may be configured to send the identified/classified information to the one or more devices, including, e.g., at least one of a database server (106) and a payment terminal (105), for performing the data analytics or initiating a payment transaction using the identified information.

Figure 3:
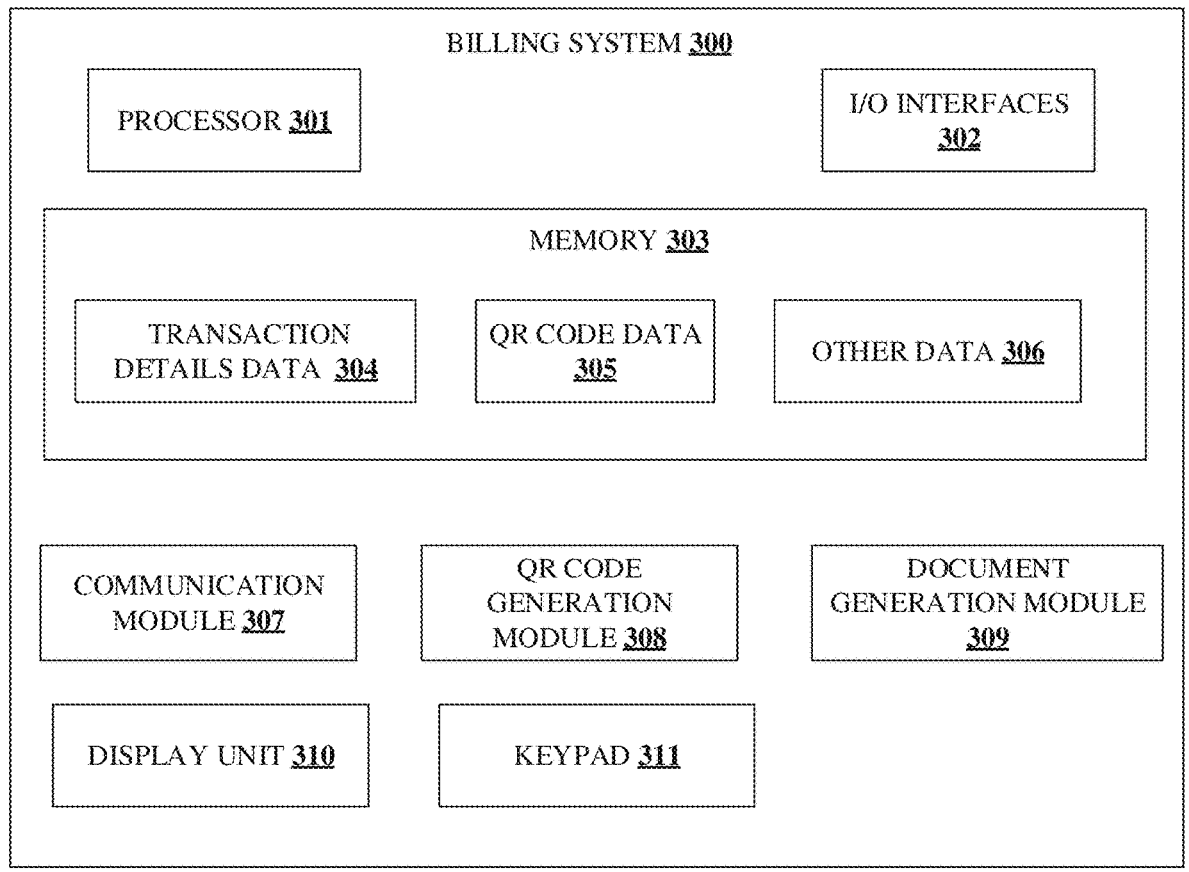
FIG. 3 shows a simplified block diagram of a billing system for generating a document with machine-readable code, in accordance with some non-limiting embodiments or aspects of the present disclosure.

FIG. 3 shows a detailed block diagram of a billing system, in accordance with non-limiting embodiments or aspects of the present disclosure. In some non-limiting embodiments or aspects, a billing system (300) may include at least one Central Processing Unit ("CPU" or "processor") (301) and a memory (303) storing instructions executable by the at least one processor (301). The processor (301) may comprise at least one data processor for executing program components for executing user- or system-generated requests. The memory (303) is communicatively coupled to the processor (301). The billing system (300) further comprises an Input/Output (I/O) interface (302). The I/O interface (302) is coupled with the processor (301) through which an input signal or/and an output signal is communicated.

In some non-limiting embodiments or aspects, the data stored in the memory (303) may include transaction details data (304), a machine-readable code data (305), and other data (306). In some non-limiting embodiments or aspects, transaction details data (304) may include a plurality of details associated with a transaction and the coordinates of the plurality of details. The plurality of details may be at least one of a picture, holographic label, numbers, alphabets, symbols, or any combination thereof to be included in the document (101). The coordinates of the plurality of details may include a location for the plurality of the details on the document (101). The coordinates may include at least one of a coordinate of a region of pixels for the plurality of details, a physical distance of a region of pixels for the plurality of details from a reference coordinate, a row and a column number of the document (101), or any combination thereof. For example, the plurality of details may include Invoice Number: AX19-144, Date: Dec. 4, 2001, Total Amount: $120, and the like. For example, the coordinates of the plurality of details may include {[x=550, y=35]}, {row numbers 7, 8, 9 and column numbers 1, 2, 3}, {[x=5 cm from the top left corner of the document (101), y=15 cm from the top left corner of the document (101)]}, and the like.

In some non-limiting embodiments or aspects, the machine-readable code data (305) may include the information regarding error detection and the error correction codes, a mask pattern, and the like needed for generating the machine-readable code (102) from the plurality of details associated with a transaction. In some non-limiting embodiments or aspects, other data (306) may include the information regarding the size of the document (101), location of the machine-readable code (102) in the document (101) and the like.

In some non-limiting embodiments or aspects, the billing system (300) may include, for example, a communication module (307), a machine-readable code generation module (308), a document generation module (309), a display unit (310), and/or a keypad (311). It will be appreciated that such aforementioned units may be represented as a single unit or a combination of different units. The billing system (300) may further include other modules, which are not depicted, that are used during operation of the billing system (300). In some non-limiting embodiments or aspects, the communication module (307) may be used to receive the plurality of details associated with the transaction, the mask pattern of the machine-readable code (102), the error detection and error correction techniques used for generating the machine-readable code (102), and the like. Further, the communication module (307) may provide the document (101), including the plurality of details and the machine-readable code (102), to a printer for printing the document (101).

In some non-limiting embodiments or aspects, the machine-readable code generation module (308) may be used to generate the machine-readable code (102) using the plurality of details associated with the transaction. In some non-limiting embodiments or aspects, the machine-readable code (102) comprises at least one of the one-dimensional bar code and the two-dimensional bar code. For example, the one-dimensional bar code includes at least one of UPC code, codebar, EAN code, code 128, and the like. In another example, the two-dimensional bar code includes at least one of a Quick Response (QR) code, data matrix, dotcode, PDF417, and the like. The machine-readable code generation module (308) may encode the received plurality of details into binary bits using at least one of a numeric, alphanumeric, byte, or kanji mode. Based on the number of binary bits, an appropriate version number is selected and a set of codewords using the error detection and error correction codes is generated. The set of codewords is converted into machine-readable code (102) where a binary bit zero indicates a white block and a binary bit one indicates a black block in the machine-readable code (102). In an exemplary embodiment, the machine-readable code (102) additionally includes a horizontal and a vertical timing pattern, the finder pattern on three corners of the machine-readable code (102).

In some non-limiting embodiments or aspects, the document generation module (309) may be used to determine the coordinates for the plurality of details based on the predetermined size of the document (101). The document generation module (309) may use a mapping table to determine the coordinates for the plurality of details. For example, the plurality of details including an invoice date may be mapped to a coordinate {[x:10, y:5], [x:20, y:5], [x:10, y:35], [x:20, y:35]} corresponding to a top left corner of the document (101). In another example, the plurality of details including a signature may be mapped to the bottom right corner of the document (101).

Further, the document generation module (309) may be used to arrange the plurality of details and the machine-readable code (102) on the predetermined size of the document (101). The plurality of the details and the machine-readable code (102) is arranged based on the determined coordinates for the plurality of details and the machine-readable code (102). As shown in FIG. 5, and in some non-limiting embodiments or aspects, the document (101) may be generated by the document generation module (309) by arranging the plurality of details and the machine-readable code (102), for example, the QR code, on the predetermined size of the document (101).

In some non-limiting embodiments or aspects, the display unit (310) may be housed on the billing system (300) and used for displaying the document (101), including the plurality of details and the machine-readable code (102). In some non-limiting embodiments or aspects, a keypad (311) may be housed on the billing system (300) and used for receiving the plurality of details from a user.

Figure 4:
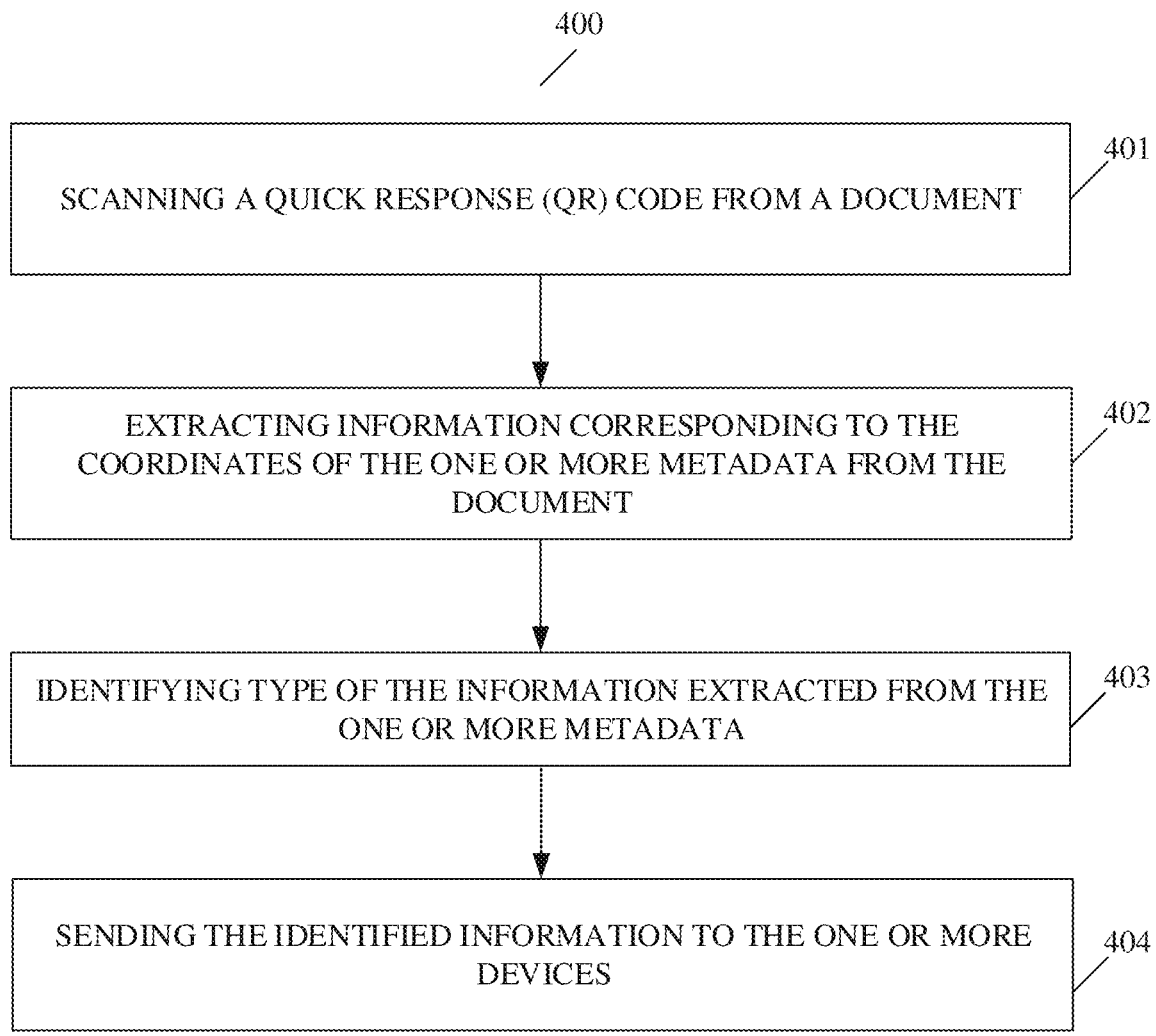
FIG. 4 shows a flow chart illustrating method steps for extracting information in a document using machine-readable code, in accordance with some non-limiting embodiments or aspects of the present disclosure.

FIG. 4 shows a flow chart illustrating method steps for extracting information in a document using the machine-readable code, in accordance with some non-limiting embodiments or aspects of the present disclosure. The order in which the method 400 is described is not intended to be construed as a limitation, and any number of the described method blocks may be combined in any order to implement the method. Additionally, individual blocks may be deleted from the methods without departing from the spirit and scope of the subject matter described herein. Furthermore, the method may be implemented in any suitable hardware, software, firmware, or combination thereof.

As illustrated in FIG. 4, and in some non-limiting embodiments or aspects, the method 400 may comprise one or more steps for extracting information in the document (101) using the machine-readable code (102). The image processing system (103) scans the machine-readable code (102) from the document (101) for determining coordinates of one or more metadata among a plurality of metadata in the document (101). Further, the information corresponding to the coordinates of the one or more metadata from the document (101) is extracted by the image processing system (103). Furthermore, the image processing system (103) identifies the type of information extracted from the one or more metadata. Finally, the image processing system (103) sends the identified information to the one or more devices for performing one or more actions using the identified information.

At step 401, the image processing system (103) scans a machine-readable code (102) from the document (101) to determine coordinates of one or more metadata among a plurality of metadata in the document (101). In some non-limiting embodiments or aspects, the machine-readable code (102) comprises at least one of the one-dimensional bar code and the two-dimensional bar code. For example, the one-dimensional bar code includes at least one of UPC code, codebar, EAN code, code 128, and the like. In another example, the two-dimensional bar code includes at least one of a Quick Response (QR) code, data matrix, dotcode, PDF417, and the like.

In some non-limiting embodiments or aspects, the document (101) is a physical document or a digitized image of the physical document. The image processing system (103) may capture an image of the physical document using an image scanning device and store the captured digitized image of the physical document for further processing. As shown in FIG. 5, and in some non-limiting embodiments or aspects, the document (101) includes the machine-readable code (102), for example, the QR code, and a plurality of information including at least one of a picture, holographic label, numbers, alphabets, symbols, and the like.

Figure 6:
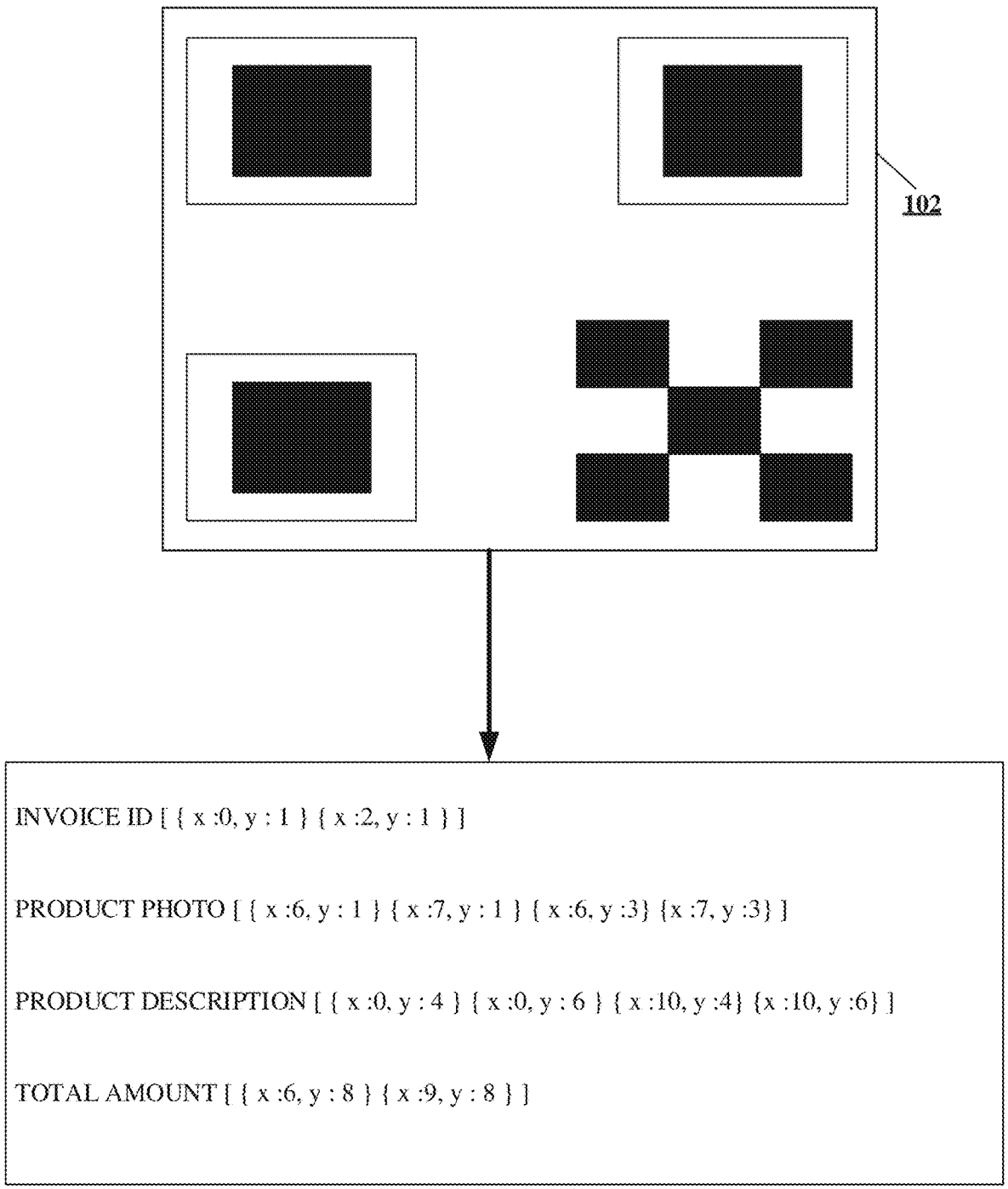
FIG. 6 shows an exemplary coordinate determined from the machine-readable code, in accordance with some non-limiting embodiments or aspects of the present disclosure.

In some non-limiting embodiments or aspects, the image processing system (103) captures an image of the machine-readable code (102) from the document (101) and decodes the machine-readable code (102) from the captured image to obtain the coordinates of the one or more metadata among the plurality of metadata in the document (101). In some non-limiting embodiments or aspects, the image processing system (103) may detect the machine-readable code (102) in an image by identifying the finder patterns. For example, the image processing system (103) binarizes the captured image of the machine-readable code (102), identifies three finder patterns, estimates the version of the machine-readable code (102) using the distance between the three finder patterns, identifies alignment patterns, and the error correction codes are applied on the pixel values of the binarized image to decode the coordinates of the one or more metadata. As shown in FIG. 6 and in some non-limiting embodiments or aspects, the image processing system (103) scans, decodes the machine-readable code (102), for example, the QR code, and obtains the coordinates of the one or more metadata among the plurality of metadata in the document (101). For example, for the one or more metadata "INVOICE ID" the coordinates may be "[{x:0, y:1}{x:2, y:1}]".

Referring back to FIG. 4, in some non-limiting embodiments or aspects, at step 402, the image processing system (103) extracts the information corresponding to the coordinates of the one or more metadata from the document (101). In some non-limiting embodiments or aspects, the coordinates of the one or more metadata includes at least one of a coordinate of a region of pixels of the one or more metadata in an image of the document (101), a physical distance of a region of pixels of the one or more metadata in the image of the document (101) from a reference coordinate, a row and a column number of the document (101), or any combination thereof. Further, the coordinates may be converted from one format to another for extracting the information from the document (101).

In some non-limiting embodiments or aspects, extracting the information from the document (101) includes identifying a group of pixels within a boundary corresponding to the coordinates of the one or more metadata based on image processing techniques, for example, connected components technique and the like. For example, the coordinates may be translated into pixels and the image processing system (103) may extract the pixels for extracting the information. A coordinate (x:0, y:1) may correspond to a pixel or a group of pixels. Thus, the image processing system (103) may extract the pixel or the group of pixels for extracting the information.

In some non-limiting embodiments or aspects, at step 403, the image processing system (103) identifies the type of the information extracted from the one or more metadata. In some non-limiting embodiments or aspects, the image processing system (103) classifies the extracted information as at least one of a picture, holographic label, numbers, alphabets, symbols, and the like and recognizes the extracted and classified information using image processing techniques. For example, the extracted information corresponding to the one or more metadata "PRODUCT PHOTO" and the coordinates of the one or more metadata "[{x:6, y:1}{x:7, y:1}{x:6, y:3}{x:7, y:3}]" may be classified as a picture. In another example, the extracted information corresponding to the one or more metadata "TOTAL AMOUNT" and the coordinates of the one or more metadata "[{x:6, y:8}{x:9, y:8}]" may be classified as a numbers and symbols. Further, the image processing system (103) may recognise the extracted and classified information using the image processing techniques like optical character recognition as "$105". In some non-limiting embodiments or aspects, at step 404, the image processing system (103) sends the identified information to the one or more devices for performing one or more actions using the identified information.

In some non-limiting embodiments or aspects, the one or more devices comprise at least one of the database server (106) and the payment terminal (105). The database server (106) and payment terminal (105) may be connected to the image processing system (103) via the communication network (104). Further, the payment terminal (105) may perform the one or more actions, for example, initiating a payment transaction, using the identified information. The database server (106) may perform the one or more actions, for example, data analytics, using the identified information.

In some non-limiting embodiments or aspects, the one or more actions performed by the database server (106) may include data analytics using the identified information. The data analytics performed by the database server (106) may include identifying the one or more merchants where the plurality of customers may initiate a transaction, identifying the one or more issuer entities where the one or more transactions encounter an error more frequently, and the like.

Figure 7:
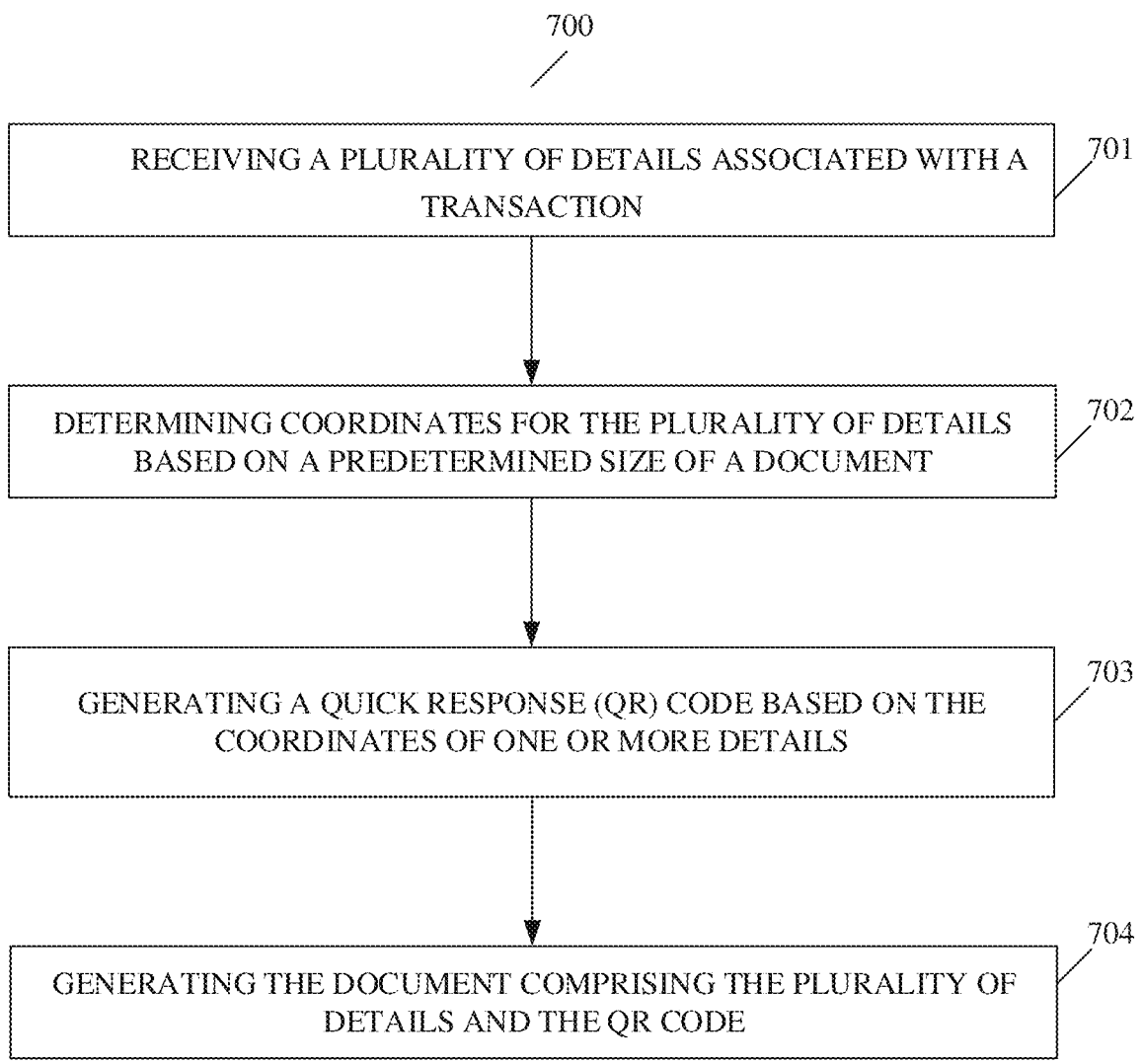
FIG. 7 shows a flow chart illustrating method steps for generating a document with machine-readable code, in accordance with some non-limiting embodiments or aspects of the present disclosure.

FIG. 7 shows a flow chart illustrating method steps for generating a document with a plurality of details and the machine-readable code, in accordance with some non-limiting embodiments or aspects. The order in which the method 700 is described is not intended to be construed as a limitation, and any number of the described method blocks may be combined in any order to implement the method. Additionally, individual blocks may be deleted from the methods without departing from the spirit and scope of the subject matter described herein. Furthermore, the method may be implemented in any suitable hardware, software, firmware, or combination thereof.

In some non-limiting embodiments or aspects, at step 701, the billing system (300) receives a plurality of details associated with a transaction. The plurality of details includes at least one of a picture, holographic label, numbers, alphabets, symbols, and the like used for generating the document (101). For example, the plurality of details may be "INVOICE ID—73825", "TOTAL AMOUNT $105", a product picture, and the like. In some non-limiting embodiments or aspects, the billing system (300) may receive the plurality of details associated with the transaction from a user using the keypad (311) or from a remote device, for example, a computer system.

In some non-limiting embodiments or aspects, at step 702, the billing system (300) may determine coordinates for the plurality of details based on a predetermined size of a document (101). The coordinates may include at least one of a coordinate of a region of pixels for the plurality of details, a physical distance of a region of pixels for the plurality of details from a reference coordinate, a row and a column number for the plurality of details in the document (101), or any combination thereof. In some non-limiting embodiments or aspects, the billing system (300) may associate the coordinates to the plurality of details based on the predetermined size of the document (101). For example, the plurality of details "TOTAL AMOUNT" may be associated with the coordinates "[{x:6, y:8}{x:9, y:8}]" based on the predetermined size of the document (101).

In some non-limiting embodiments or aspects, at step 703, the billing system (300) may generate a machine-readable code (102) comprising the coordinates of one or more details among the plurality of details and the one or more details. In some non-limiting embodiments or aspects, the billing system (300) may select the one or more details and the corresponding coordinates among the plurality of details to generate the machine-readable code (102). In some non-limiting embodiments or aspects, the machine-readable code (102) comprises at least one of the one-dimensional bar code and the two-dimensional bar code. For example, the one-dimensional bar code includes at least one of UPC code, codebar, EAN code, code 128, and the like. In another example, the two-dimensional bar code includes at least one of a Quick Response (QR) code, data matrix, dotcode, PDF417, and the like. The one or more details to be selected may be predetermined, for example, the merchant details, the total amount, and the like.

The billing system (300) may encode the received plurality of details into binary bits using at least one of a numeric, alphanumeric, byte, or kanji mode. For example, consider the received plurality of details as "Hello, World! 123". The binary bits using the byte mode may be generated by the billing system (300) as given below:

| | | | | | |
|---|---|---|---|---|---|
| 01001000 | 01100101 | 01101100 | 01101100 | 01101111 | 00101100 |
| 00100000 | 01110111 | 01101111 | 01110010 | 01101100 | 01100100 |
| 00100001 | 00100000 | 00110001 | 00110010 | 00110011 | |

Based on the number of binary bits, an appropriate version number is selected and a set of codewords using the error detection and error correction codes is generated. For example, for the binary bits generated corresponding to the plurality of details as "Hello, World! 123" a version 1 may be selected and reed-solomon error correction codes may be used to generate the set of codewords. The generated set of codewords may be as shown below:

0100000100010100100001100101011010001101100-
0110111100101100010 00000111011101110111101-
110010011011000110010000100001001000000011
000100110010001100110000100001011010100101-
011110000011100001010 0011011011001001.

The set of codewords is converted into machine-readable code (102) by placing the binary bits in a zig-zag format where a binary bit zero indicates a white block and a binary bit one indicates a black block in the machine-readable code (102). The machine-readable code (102) additionally includes a horizontal and a vertical timing pattern, the finder pattern on three corners of the machine-readable code (102).

In some non-limiting embodiments or aspects, at step 704, the billing system (300) generates the document (101) including the plurality of details and the machine-readable code (102). The billing system (300) may arrange the plurality of details and the machine-readable code (102) on the predetermined size of the document (101) based on the determined coordinates for the plurality of details. The exemplary document generated by the billing system (300) comprising the machine-readable code (102), for example, the Quick Response (QR) code, is illustrated in FIG. 5.

In some non-limiting embodiments or aspects, the document (101) comprising the plurality of details and a machine-readable code (102) is transmitted to a printer for printing the document (101). In some non-limiting embodiments or aspects, the document (101) comprising the plurality of details and a machine-readable code (102) may be sent to one or more devices connected to the billing system (300), for example, a smartphone, a server, and the like.

Thus, the system and computer-implemented method for extracting information in a document (101) using the machine-readable code (102) may be used to retrieve the required information from a document (101) based on the coordinates information. The machine-readable code (102) may contain the coordinates of the required information helping in quick extraction of the information required for further data processing. The coordinate information in the machine-readable code (102) eliminates the need to search the entire document (101) for the required information.

Figure 8:
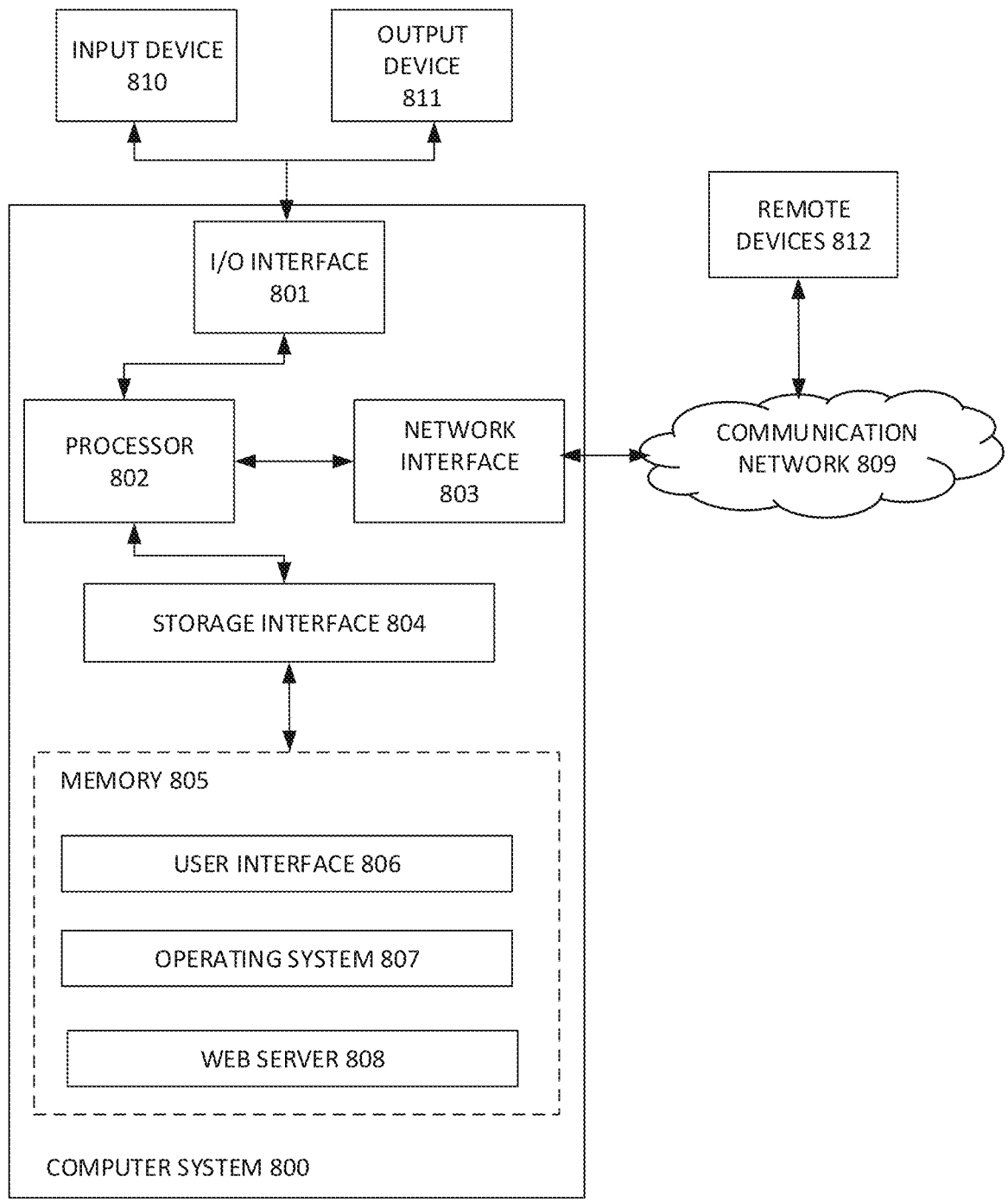
FIG. 8 shows an exemplary computer system for extracting information from a document using the machine-readable code, in accordance with some non-limiting embodiments or aspects of the present disclosure.

FIG. 8 illustrates a block diagram of an exemplary computer system (800) for implementing embodiments consistent with the present disclosure. In some non-limiting embodiments or aspects, the computer system (800) may be used to implement the method for extracting information from a document (101) using the machine-readable code (102). The computer system (800) may comprise a central processing unit ("CPU" or "processor") (802). The processor (802) may comprise at least one data processor for executing program components for dynamic resource allocation at run time. The processor (802) may include specialized processing units such as integrated system (bus) controllers, memory management control units, floating point units, graphics processing units, digital signal processing units, etc.

The processor (802) may be disposed in communication with one or more input/output (I/O) devices (not shown) via I/O interface (801). The I/O interface (801) may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth®, cellular (e.g., code-division multiple access (CDMA), high-speed packet access (HSPA+), global system for mobile communications (GSM), long-term evolution (LTE), WiMax, or the like), etc.

Using the I/O interface (801), the computer system (800) may communicate with one or more I/O devices. For example, the input device (810) may be an antenna, keyboard, mouse, joystick, (infrared) remote control, camera, card reader, fax machine, dongle, biometric reader, microphone, touch screen, touchpad, trackball, stylus, scanner, storage device, transceiver, video device/source, etc. The output device (811) may be a printer, fax machine, video display (e.g., cathode ray tube (CRT), liquid crystal display (LCD), light-emitting diode (LED), plasma, plasma display panel (PDP), organic light-emitting diode display (OLED), or the like), audio speaker, etc.

In some non-limiting embodiments or aspects, the computer system (800) is connected to the service operator through a communication network (809). The processor (802) may be disposed in communication with the communication network (809) via a network interface (803). The network interface (803) may communicate with the communication network (809). The network interface (803) may employ connection protocols including, without limitation, direct connect, Ethernet (e.g., twisted pair 10/100/1000 Base T), transmission control protocol/Internet protocol (TCP/IP), token ring, IEEE 802.11a/b/g/n/x, etc. The communication network (809) may include, without limitation, a direct interconnection, e-commerce network, a peer to peer (P2P) network, local area network (LAN), wide area network (WAN), wireless network (e.g., using Wireless Application Protocol), the Internet, Wi-Fi®, etc. Using the network interface (803) and the communication network (809), the computer system (800) may communicate with the one or more service operators.

In some non-limiting embodiments or aspects, the processor (802) may be disposed in communication with a memory (805) (e.g., RAM, ROM, etc. not shown in FIG. 8 via a storage interface (804). The storage interface (804) may connect to memory (805) including, without limitation, memory drives, removable disc drives, etc., employing connection protocols such as serial advanced technology attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory (805) may store a collection of program or database components, including, without limitation, user interface (806), an operating system (807), web server (808), etc. In some embodiments, computer system (800) may store user/application data (806), such as the data, variables, records, etc. as described in this disclosure. Such databases may be implemented as fault-tolerant, relational, scalable, secure databases such as Oracle or Sybase.

The operating system (807) may facilitate resource management and operation of the computer system (800). Examples of operating systems include, without limitation, APPLE® MACINTOSH® OS X®, UNIX®, UNIX-like system distributions (E.G., BERKELEY SOFTWARE DISTRIBUTION® (BSD), FREEBSD®, NETBSD®, OPENBSD, etc.), LINUX® DISTRIBUTIONS (E.G., RED HAT®, UBUNTU®, KUBUNTU®, etc.), IBM® OS/2®, MICROSOFT® WINDOWS® (XP®, VISTA®/7/8, 10 etc.), APPLE® IOS®, GOOGLE™ ANDROID™, BLACKBERRY® OS, or the like.

In some non-limiting embodiments or aspects, the computer system (800) may implement a web browser (not shown in the figures) stored program component. The web browser (not shown in the figures) may be a hypertext viewing application, such as MICROSOFT® INTERNET EXPLORER®, GOOGLE™ CHROME™, MOZILLA® FIREFOX®, APPLE® SAFARI®, etc. Secure web browsing may be provided using Secure Hypertext Transport Protocol (HTTPS), Secure Sockets Layer (SSL), Transport Layer Security (TLS), etc. Web browsers may utilize facilities such as AJAX, DHTML, ADOBE® FLASH®, JAVASCRIPT®, JAVA®, Application Programming Interfaces (APIs), etc. In some embodiments, the computer system (800) may implement a mail server (not shown in the figures) stored program component. The mail server may be an Internet mail server such as Microsoft Exchange, or the like. The mail server (not shown in the figures) may utilize facilities such as Active Server Pages (ASP), ACTIVEX®, ANSI® C++/C #, MICROSOFT®, .NET, CGI SCRIPTS, JAVA®, JAVASCRIPT®, PERL®, PHP, PYTHON®, WEBOBJECTS®, etc. The mail server may utilize communication protocols such as Internet Message Access Protocol (IMAP), Messaging Application Programming Interface (MAPI), MICROSOFT® Exchange, Post Office Protocol (POP), Simple Mail Transfer Protocol (SMTP), or the like. In some embodiments, the computer system (800) may implement a mail client (not shown in the figures) stored program component. The mail client (not shown in the figures) may be a mail viewing application, such as APPLE® MAIL, MICROSOFT® ENTOURAGE®, MICROSOFT® OUTLOOK®, MOZILLA® THUNDERBIRD®, etc.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, e.g., non-transitory. Examples include Random Access Memory (RAM), Read-Only Memory (ROM), volatile memory, non-volatile memory, hard drives, Compact Disc (CD) ROMs, Digital Video Disc (DVDs), flash drives, disks, and any other known physical storage media.

In some non-limiting embodiments or aspects, computer system (800) may receive the digitized image of the document (101) from a remote devices (812) via a communication network (809).

The terms "some non-limiting embodiments or aspects", "embodiment", "embodiments", "the embodiment", "the embodiments", "one or more embodiments", "some embodiments", and "one embodiment" mean "one or more (but not all) embodiments of the disclosure(s)" unless expressly specified otherwise.

The terms "including", "comprising", "having", and variations thereof mean "including but not limited to", unless expressly specified otherwise.

The enumerated listing of items does not imply that any or all of the items are mutually exclusive, unless expressly specified otherwise. The terms "a", "an", and "the" mean "one or more", unless expressly specified otherwise.

A description of some non-limiting embodiments or aspects with several components in communication with each other does not imply that all such components are required. On the contrary, a variety of optional components is described to illustrate the wide variety of possible embodiments of the disclosure.

When a single device or article is described herein, it may be readily apparent that more than one device/article (whether or not they cooperate) may be used in place of a single device/article. Similarly, where more than one device or article is described herein (whether or not they cooperate), it may be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the disclosure need not include the device itself.

The illustrated operations of FIG. 4 and FIG. 7 show certain events occurring in a certain order. In alternative embodiments, certain operations may be performed in a different order, modified, or removed. Moreover, steps may be added to the above-described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based here on. Accordingly, the disclosure of the embodiments of the disclosure is intended to be illustrative, but not limiting, of the scope of the disclosure, which is set forth in the following claims.

While various aspects and embodiments have been disclosed herein, other aspects and embodiments may be apparent to those skilled in the art. The various aspects and embodiments disclosed herein are for purposes of illustration and are not intended to be limiting, with the true scope and spirit being indicated by the following claims.

What is claimed is:

1. A computer-implemented method comprising:
receiving, by a billing system, a plurality of details associated with a transaction;
determining, by the billing system, coordinates for the plurality of details based on a predetermined size of a document;
generating, by the billing system, a machine-readable code based on the coordinates of one or more details among the plurality of details and the one or more details;
generating, by the billing system, the document comprising the plurality of details arranged on the document based on the determined coordinates for the plurality of details and the document comprising the machine-readable code, wherein the document is generated after receiving the plurality of details;
scanning, by an image processing system, the machine-readable code from the document for determining coordinates of one or more metadata among a plurality of metadata in the document, wherein the plurality of metadata corresponds to the plurality of details;
extracting, by the image processing system, information corresponding to the coordinates of the one or more metadata from the document;
identifying, by the image processing system, type of the information extracted from the one or more metadata; and
sending, by the image processing system, the identified information to one or more devices for performing one or more actions using the identified information.

2. The method of claim 1, wherein the machine-readable code comprises at least one of a one-dimensional bar code and a two-dimensional bar code.

3. The method of claim 1, wherein scanning the machine-readable code comprises:
capturing an image of the machine-readable code from the document; and
decoding the machine-readable code from the captured image to obtain the coordinates of the one or more metadata among the plurality of metadata in the document.

4. The method of claim 1, wherein the coordinates of the one or more metadata comprises at least one of the following: coordinates of a region of pixels of the one or more metadata in an image of the document, a physical distance of a region of pixels of the one or more metadata in the image of the document from a reference coordinate, or any combination thereof.

5. The method of claim 1, wherein extracting the information comprises identifying a group of pixels within a boundary corresponding to the coordinates of the one or more metadata based on image processing techniques.

6. The method of claim 1, wherein identifying the type of the information comprises:
classifying the extracted information as at least one of the following: a picture, holographic label, numbers, alphabets, symbols, or any combination thereof; and
recognizing the extracted and classified information using image processing techniques.

7. The method of claim 1, wherein the one or more devices comprises at least one of a database server and a payment terminal.

8. The method of claim 1, wherein performing the one or more actions comprises at least one of the following: initiating a payment transaction, performing data analytics, or any combination thereof.

9. A system for generating a document and extracting information in the document using machine-readable code, comprising:
a processor; and
a memory communicatively coupled to the processor, wherein the memory stores processor instructions, which, on execution, causes the processor to:
receive a plurality of details associated with a transaction;
determine coordinates for the plurality of details based on a predetermined size of the document;
generate the machine-readable code based on the coordinates of one or more details among the plurality of details and the one or more details;
generate the document comprising the plurality of details arranged on the document based on the determined coordinates for the plurality of details and the document comprising the machine-readable code wherein the document is generated after receiving the plurality of details;
scan the machine-readable code from the document for determining coordinates of one or more metadata among a plurality of metadata in the document;
extract information corresponding to the coordinates of the one or more metadata from the document;
identify type of the information extracted from the one or more metadata; and
send the identified information to one or more devices for performing one or more actions using the identified information.

10. The system of claim 9, wherein the scanning comprises:
capturing an image of the machine-readable code from the document; and
decoding the machine-readable code from the captured image to obtain coordinates of the one or more metadata among the plurality of metadata in the document.

11. The system of claim 9, wherein the coordinates of the one or more metadata comprises at least one of the following: coordinates of a region of pixels of the one or more metadata in an image of the document, a physical distance of a region of pixels of the one or more metadata in the image of the document from a reference coordinate, or any combination thereof.

12. The system of claim 9, wherein the extraction comprises identifying a group of pixels within a boundary corresponding to the coordinates of the one or more metadata based on image processing techniques.

13. The system of claim 9, wherein the identification comprises:
classifying the extracted information as at least one of the following: a picture, holographic label, numbers, alphabets, symbols, or any combination thereof; and
recognizing the extracted and classified information using image processing techniques.

14. The system of claim 9, wherein the one or more devices comprises at least one of a database server and a payment terminal.

15. The system of claim 9, wherein the one or more actions comprises at least one of the following: initiating a payment transaction, performing data analytics, or any combination thereof.

16. A computer-implemented method comprising:
receiving, by a billing system, a plurality of details associated with a transaction;
determining, by the billing system, coordinates for the plurality of details based on a predetermined size of a document;
generating, by the billing system, a machine-readable code based on the coordinates of one or more details among the plurality of details and the one or more details; and
generating, by the billing system, the document comprising the plurality of details arranged on the document based on the determined coordinates for the plurality of details and the document comprising the machine-readable code, wherein the document is generated after receiving the plurality of details.

17. The method of claim 16, wherein the plurality of details comprises at least one of the following: a picture, holographic label, numbers, alphabets, symbols, or any combination thereof.

18. The method of claim 16, wherein the coordinates comprise at least one of the following: coordinates of a region of pixels for the plurality of details, a physical distance of a region of pixels for the plurality of details from a reference coordinate, or any combination thereof.

19. The method of claim 16, wherein generating the document comprises arranging the plurality of details and the machine-readable code on the predetermined size of the document based on the determined coordinates for the plurality of details.

20. The method of claim 16, wherein the document comprising the plurality of details and a machine-readable code is transmitted to a printer for printing the document.

* * * * *